US012316190B2

(12) United States Patent
Yoshizue

(10) Patent No.: US 12,316,190 B2
(45) Date of Patent: May 27, 2025

(54) CASE STRUCTURE OF IN-WHEEL MOTOR

(71) Applicant: TOYOTA JIDOSHA KABUSHIKI KAISHA, Aichi-ken (JP)

(72) Inventor: Kensuke Yoshizue, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 389 days.

(21) Appl. No.: 17/878,051

(22) Filed: Aug. 1, 2022

(65) Prior Publication Data
US 2023/0057218 A1    Feb. 23, 2023

(30) Foreign Application Priority Data

Aug. 18, 2021    (JP) ................................. 2021-133551

(51) Int. Cl.
*H02K 5/10* (2006.01)
*B60K 7/00* (2006.01)
*H02K 5/12* (2006.01)

(52) U.S. Cl.
CPC ............. *H02K 5/10* (2013.01); *B60K 7/0007* (2013.01); *H02K 5/12* (2013.01); *H02K 2205/09* (2013.01)

(58) Field of Classification Search
CPC ............ H02K 5/10; H02K 5/12; H02K 5/132; H02K 2205/09; B60K 7/0007; F16H 57/027; F16H 57/0416; F16H 57/0408; F16H 57/0456; F16H 57/0483
USPC ................. 310/85, 87, 88, 89, 417; 475/160
See application file for complete search history.

(56) References Cited

U.S. PATENT DOCUMENTS

| 7,191,870 B2* | 3/2007 | Kimura ................. F16H 57/027 74/606 R |
| 8,944,195 B2* | 2/2015 | Fischer ..................... H02K 5/10 180/65.51 |
| 2021/0095752 A1* | 4/2021 | Hensel ..................... B60K 1/00 |

FOREIGN PATENT DOCUMENTS

| EP | 2006532 A1 | 12/2008 | |
| JP | 2009-002409 A | 1/2009 | |
| JP | 2011-193559 A | 9/2011 | |
| JP | 201660422 A | 4/2016 | |
| JP | 2018035878 A * | 3/2018 | |
| JP | 2020192951 A * | 12/2020 | ........... B60K 7/0007 |

OTHER PUBLICATIONS

Machine Translation of JP 2018035878 A, 2024, Clarivate Analytics (Year: 2024).*

(Continued)

*Primary Examiner* — Oluseye Iwarere
*Assistant Examiner* — Justin Stefanon
(74) *Attorney, Agent, or Firm* — HAUPTMAN HAM, LLP

(57) ABSTRACT

A case structure of an in-wheel includes a case of the in-wheel motor, a ventilation hole that allows air to flow between an inner side and an outer side of the case, and a cover that covers the ventilation hole from the outer side of the case. The cover includes an air hole that is located below the opening portion of the ventilation hole and that opens to the outer side of the cover, and an air chamber that holds air above the air hole. The air chamber is divided into a first region located above the opening portion, and a second region located below the opening portion. The second region has a volume that holds air that suppresses a water level of water in the cover to be below the opening portion when water enters inside the cover from the air hole.

3 Claims, 6 Drawing Sheets

(56) References Cited

OTHER PUBLICATIONS

Machine Translation of JP 2020192951 A, 2024, Clarivate Analytics (Year: 2024).*
www.engineeringtoolbox.com, Air Density-Specific Weight, Oct. 18, 2024 (Year: 2024).*
www.chemeurope.com, Density of Air, Oct. 18, 2024 (Year: 2024).*
https://www.chemeurope.com/en/encyclopedia/Density_of_air.html (Year: 2024).*
https://www.engineeringtoolbox.com/air-density-specific-weight-d_600.html (Year: 2024).*
https://www.j-platpat.inpit.go.jp/ machine translation of JP 2018035878 (Year: 2024).*

* cited by examiner

CASE STRUCTURE OF IN-WHEEL MOTOR

CROSS-REFERENCE TO RELATED APPLICATION

This application claims priority to Japanese Patent Application No. 2021-133551 filed on Aug. 18, 2021, incorporated herein by reference in its entirety.

BACKGROUND

1. Technical Field

The present disclosure relates to the structure of a case that houses a component of an in-wheel motor mounted on a vehicle, the in-wheel motor serving as a driving force source.

2. Description of Related Art

Japanese Unexamined Patent Application Publication No. 2016-60422 (JP 2016-60422 A) describes an disclosure relating to a breather structure of an in-wheel motor in which the object is to facilitate a piping layout of the breather hose provided in a casing of the in-wheel motor. The breather structure of the in-wheel motor described in JP 2016-60422 A includes a breather hose (a breather and a tubular member that communicates with the breather) that communicates with an inner side of the casing of the in-wheel motor and that extends from a surface on an outer side of the casing, a suspension member (trailing arm) that attaches and supports the in-wheel motor to a vehicle body side member, and a cover that is attached to the suspension member and that covers the breather hose. The breather hose is attached to the suspension member together with the cover so that an opening portion at a tip is located inside the cover.

SUMMARY

In the breather structure of the in-wheel motor described in JP 2016-6042:2 A, the opening portion at the tip of the breather hose that is arranged in an engine compartment in the conventional configuration, is arranged at a position of a trailing arm of the suspension. As a result, a length of the breather hose is shortened, and the piping layout of the breather hose is facilitated. In addition, the cover attached to the trailing arm that covers the breather hose can protect the breather hose from foreign substances such as stones, sand, and mud flying from the outside. However, in the breather structure of the in-wheel motor described in JP 2016-60422 A, water may enter the casing of the in-wheel motor from the breather hose.

For example, when a vehicle equipped with the in-wheel motor travels on a road flooded by heavy rain or flood, or when the vehicle travels on a puddle or a river during off-road driving, a situation in which the entire tire of the vehicle is submerged, that is, a situation in which the in-wheel motor is submerged is assumed. In such a situation, there is a possibility that the trailing arm of the suspension is also submerged. Thus, in the breather structure of the in-wheel motor described in JP 2016-60422 A, there is a possibility that the breather hose attached to the trailing arm is also submerged. Therefore, there is a possibility that rainwater or muddy water enters into the casing of the in-wheel motor from the opening portion at the tip of the breather hose. Furthermore, when the in-wheel motor is submerged as described above, a temperature inside the casing drops, a volume of air inside the casing contracts, and a pressure inside the casing decreases accordingly and becomes lower than the atmospheric pressure. That is, the inside of the casing is in a so-called negative pressure state. In such a case, not only the breather hose is flooded, but there is also a possibility that rainwater or muddy water is sucked into the casing of the in-wheel motor from the breather hose.

The present disclosure is conceived by paying attention to the above technical problems, and an object of the disclosure is to provided a case structure of an in-wheel motor that is able to surely suppress, with a simple configuration, a situation in which water enters an inner side of the case of the in-wheel motor, even in a situation where tires of a vehicle are submerged.

In order to achieve the object described above, the disclosure is a case structure of an in-wheel motor mounted on a vehicle, the case structure including a case that defines an outer shell of the in-wheel motor, a ventilation hole (for example, a breather) that is provided in the case and that allows air to flow between an inner side of the case and an outer side of the case, and a cover that covers the ventilation hole from the outer side of the case, in which the ventilation hole includes an opening portion that opens to the outer side of the case in the cover, in which the cover includes an air hole that is located below an opening position of the opening portion in a vertical direction and that opens to the outer side of the cover, and an air chamber that holds air on an inner side above an opening position of the air hole in the vertical direction, in which the air chamber is divided into a first region located above the opening position of the opening portion in the vertical direction, and a second region located below the opening position of the opening portion in the vertical direction, in which the second region has a volume that holds air that suppresses a water level of water in the cover in the vertical direction to be below the opening position of the opening portion when the in-wheel motor is submerged and water enters inside the cover from the air hole.

Further, the volume of the second region in the present disclosure may be larger than a volume corresponding to a maximum air amount that is assumed to be sucked into the case from the opening portion when a temperature inside the case decreases and (a volume of) air inside the case contracts, that is, when air inside the case contracts and the inside of the case becomes negative pressure.

Further, the volume of the second region in the present disclosure may be larger than 20% of a volume of air present the case at room temperature (for example, around 20° C.).

The present disclosure may further include: a hood member that covers a surface of the case from the outer side of the case and that holds a predetermined volume of air; and a connecting member that allows air to communicate between an inner portion of the hood member and the second region.

In the case structure of the in-wheel motor according to the present disclosure, the cover is provided to cover and protect the ventilation hole for passing air between the inner side and the outer side of the case. The cover is formed with the air hole at a lower end portion in the vertical direction when the cover is attached to the case. The cover is open to the outside only at the portion of the air hole. Thus, the air chamber for holding the air in the cover is formed in the inner side portion above the air hole in the vertical direction of the cover. The air chamber can be divided into the first region above the ventilation hole and the second region below the ventilation hole. The second region thereof has a volume that holds the air that suppresses the water level of the water in the cover in the vertical direction to be below the opening position of the opening portion when water enters from the air hole of the cover. Thus, even if water enters inside the cover, it is possible to suppress water from entering from the ventilation holes in the cover to the inner side of the case. Therefore, with the case structure of the in-wheel motor according to the present disclosure, even when the in-wheel motor is submerged and the case to which the ventilation hole is attached is also submerged, it is possible to easily suppress water from entering the inner side of the case, with the configuration provided with the cover the case having a simple shape.

Further, in the case structure of the in-wheel motor of the present disclosure, the air chamber, that is, the cover is formed so that the volume of the second region of the air chamber as described above becomes larger than the volume corresponding to the air amount that has a possibility of being sucked into the case when the inside of the case becomes a so-called negative pressure. Thus, for example, it is possible to suppress water from entering the first region in the cover, when the in-wheel motor is submerged, and in accordance thereof, when the temperature inside the case of the in-wheel motor drops, the inside of the case becomes a negative pressure, and the air inside the cover becomes sucked into the case. Therefore, with the case structure of the in-wheel motor according to the present disclosure, even if the in-wheel motor is submerged and water enters inside the cover, it is possible to surely suppress the water from entering inside from the ventilation hole in the cover to the inner side of the case.

Further, in the case structure of the in-wheel motor of the present disclosure, for example, the volume of the second region of the air chamber as described above is set, by assuming a case in which the temperature of air in the case drops from about 70° C. to about 20° C., that is, a case in which a temperature difference of about 50° C. occurs and the volume of air changes by about 18.3%. Specifically, the air chamber, that is, the cover is formed so that the volume of the second region in the air chamber is, for example, larger than 20% (≈18.3%) of the volume of air existing in the case at room temperature of around 20° C. Thus, for example, when the operating in-wheel motor is submerged, in a case in which the temperature inside the case drops from a high temperature of about 70° C. to about 20° C. and in conjunction thereof the volume of air in the case decreases by about 18.3% and inside the case becomes negative pressure, it is possible to suppress water from entering the first region in the cover. Therefore, with the case structure of the in-wheel motor according to the present disclosure, even if the in-wheel motor is submerged and water enters inside the cover, it is possible to surely suppress the water from entering inside from the ventilation hole in the cover to the inner side of the case.

In the case structure of the in-wheel motor of the present disclosure, provided are a hood member (or another cover member) that covers a surface of the case from the outer side of the case of the in-wheel motor and that holds a predetermined volume of air in an inner side portion, and a connecting member that allows air to communicate between the inner side portion of the hood member and the second region of the air chamber as described above. The second region of the air chamber and the inside of the hood member are communicated with by the connecting member in a state where airtightness is maintained. Thus, the volume of the portion that holds air in the hood member can be added to the volume of the second region in the air chamber. Thereby, the degree of freedom when setting the volume of the second region in the air chamber can be increased. Therefore, with the case structure of the in-wheel motor according to the present disclosure, even when the in-wheel motor is submerged and the case to which the ventilation hole is attached is also submerged, it is possible to easily suppress water from entering the inner side of the case.

BRIEF DESCRIPTION t F THE DRAWINGS

Features, advantages, and technical and industrial significance of exemplary embodiments of the disclosure will be described below with reference to the accompanying drawings, in which like signs denote like elements, and wherein.

Figure 5:
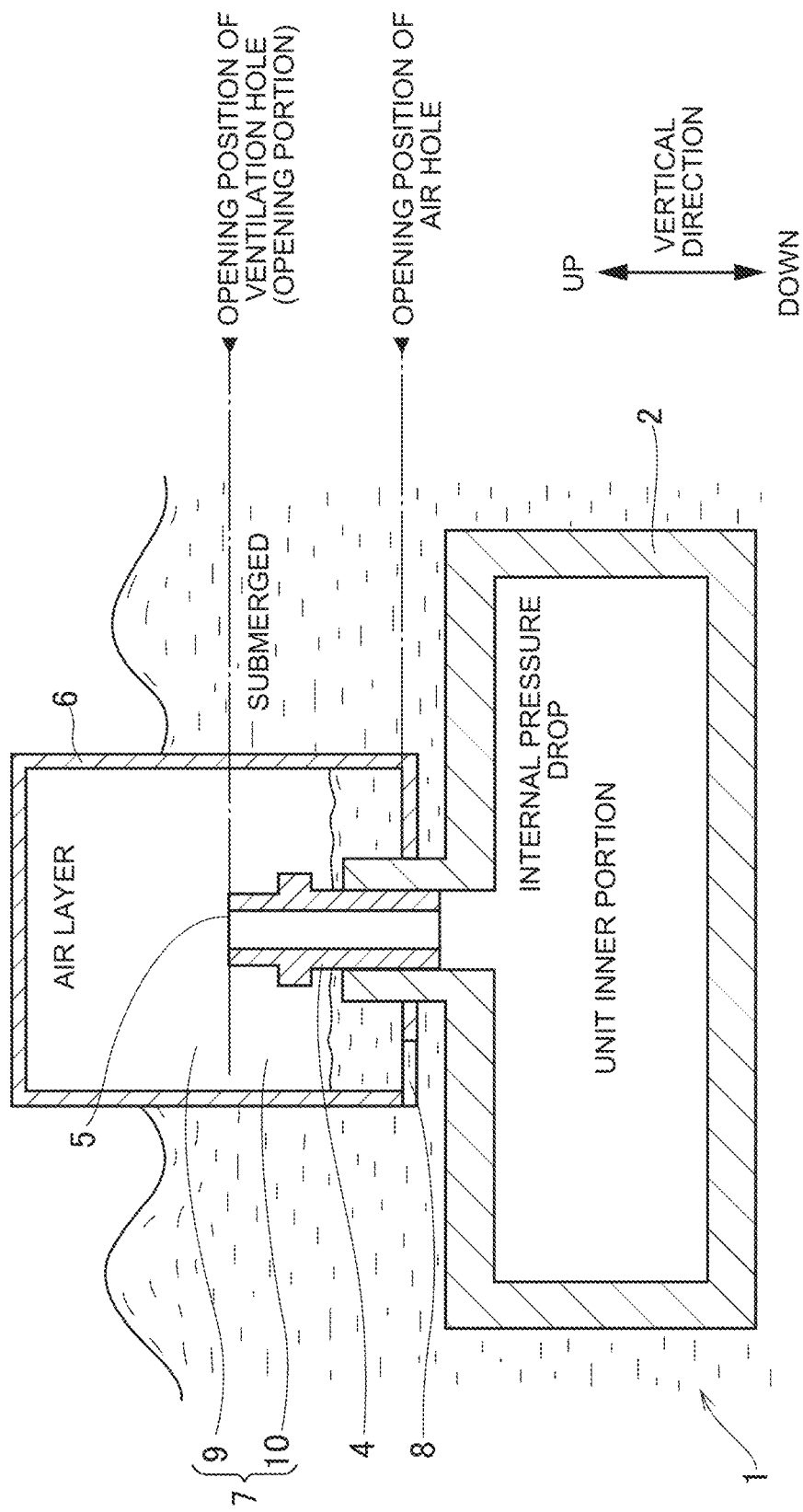
Figure 6:
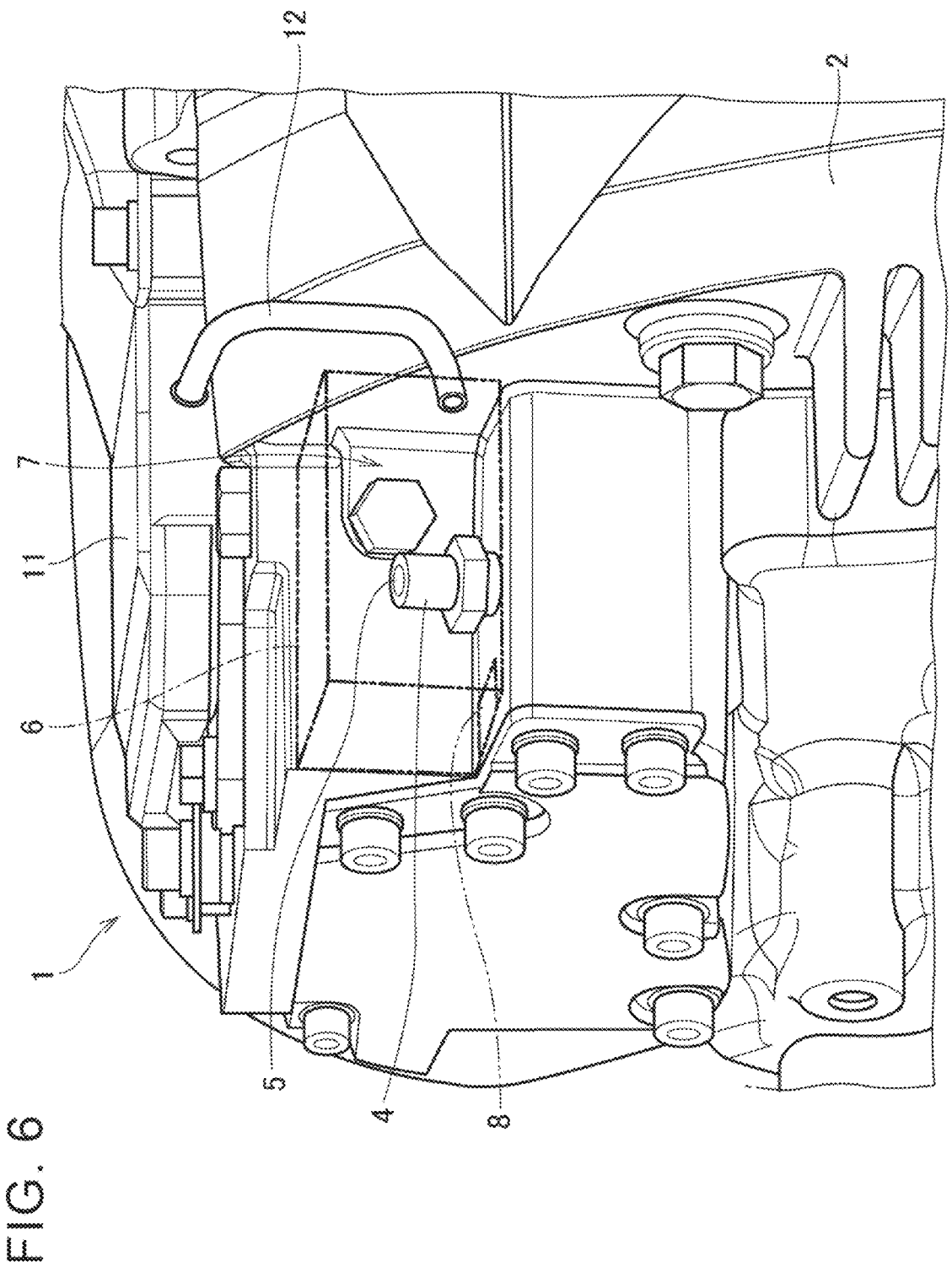

FIG. 5 is a diagram for explaining a configuration of the case structure of the in-wheel motor according to the disclosure, in which the diagram is a sectional view indicating details of the ventilation hole and the cover in the case structure of the in-wheel motor of the disclosure, and in which the diagram is a sectional view indicating a state where an inner side of the case becomes negative pressure and a predetermined amount of air is sucked in from the ventilation hole when the in-wheel motor is submerged in water;

FIG. 6 is a diagram for explaining the configuration of the case structure of the in-wheel motor according to the present disclosure, in which the diagram is a perspective view indicating an example in which a connecting member is provided, the connecting member communicating between an inner portion of a hood member for cable protection and a second region in an air chamber in the cover.

DETAILED DESCRIPTION OF EMBODIMENTS

An embodiment of the present disclosure will be described with reference to the drawings. It should be noted that the embodiments shown below are merely examples of cases where the present disclosure is embodied, and do not limit the present disclosure.

Figure 1:
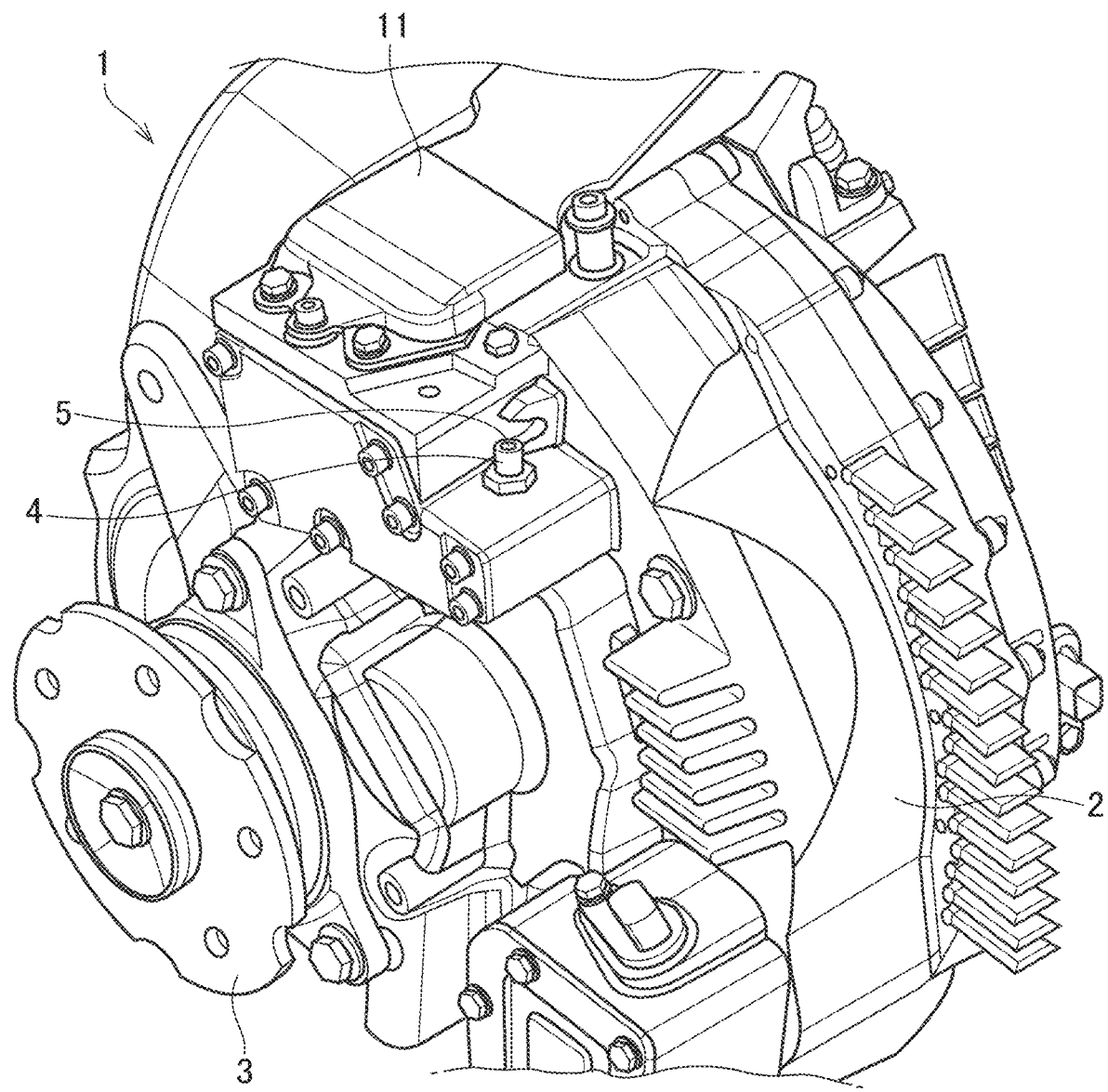
FIG. 1 is a diagram for describing a configuration of a case structure of an in-wheel motor according to the present disclosure, in which the diagram is a perspective view indicating an external appearance (a ventilation hole and an opening portion of the ventilation hole in a state where a cover is removed) of the case structure of the in-wheel motor according to the disclosure.
Figure 2:
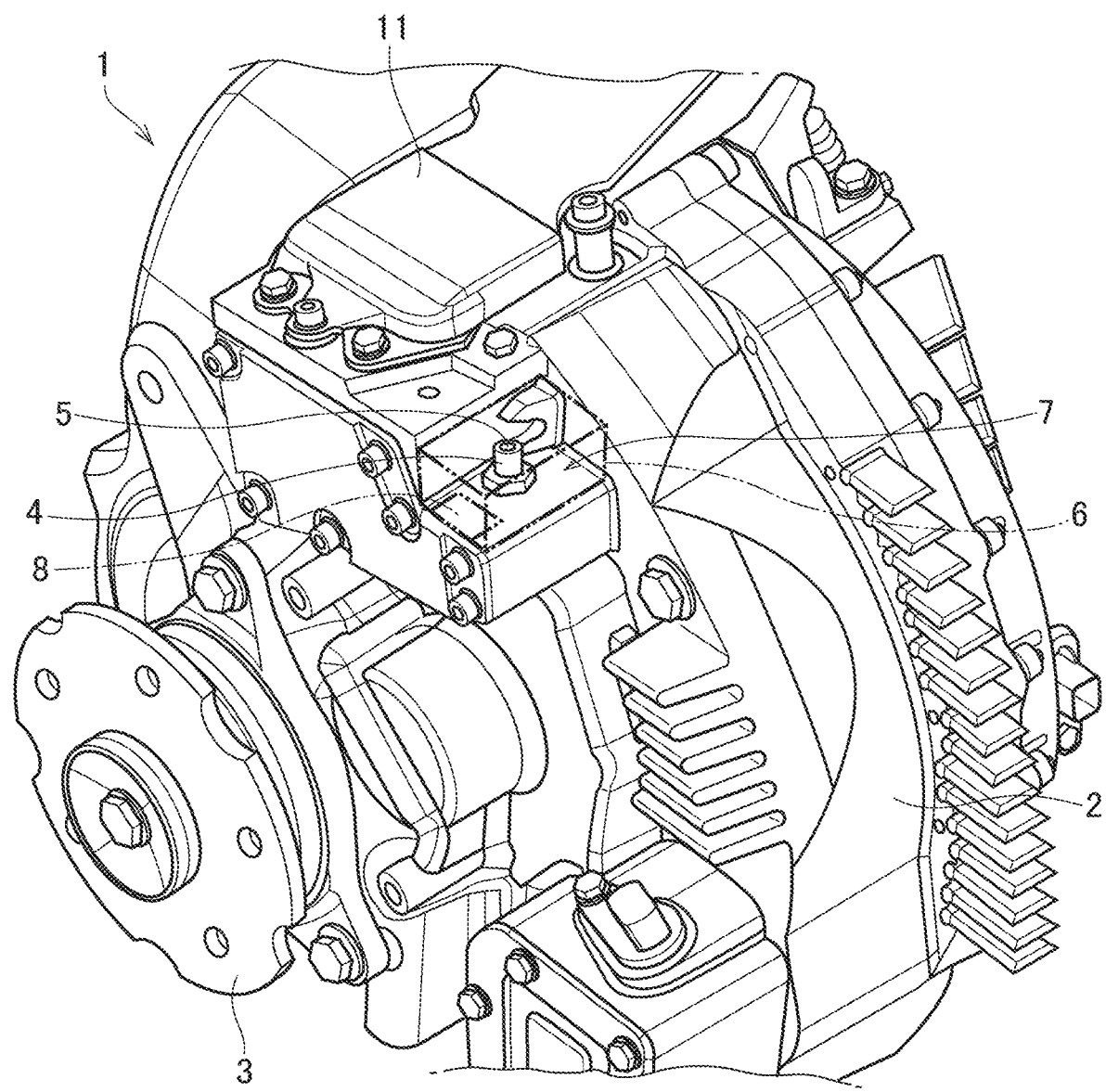
FIG. 2 is a diagram for describing a configuration of a case structure of an in-wheel motor according to the present disclosure, iii which the diagram is a perspective view indicating an external appearance (a positional relationship between the ventilation hole and the cover in a state where the cover is attached) of the case structure of the in-wheel motor according to the disclosure.
Figure 3:
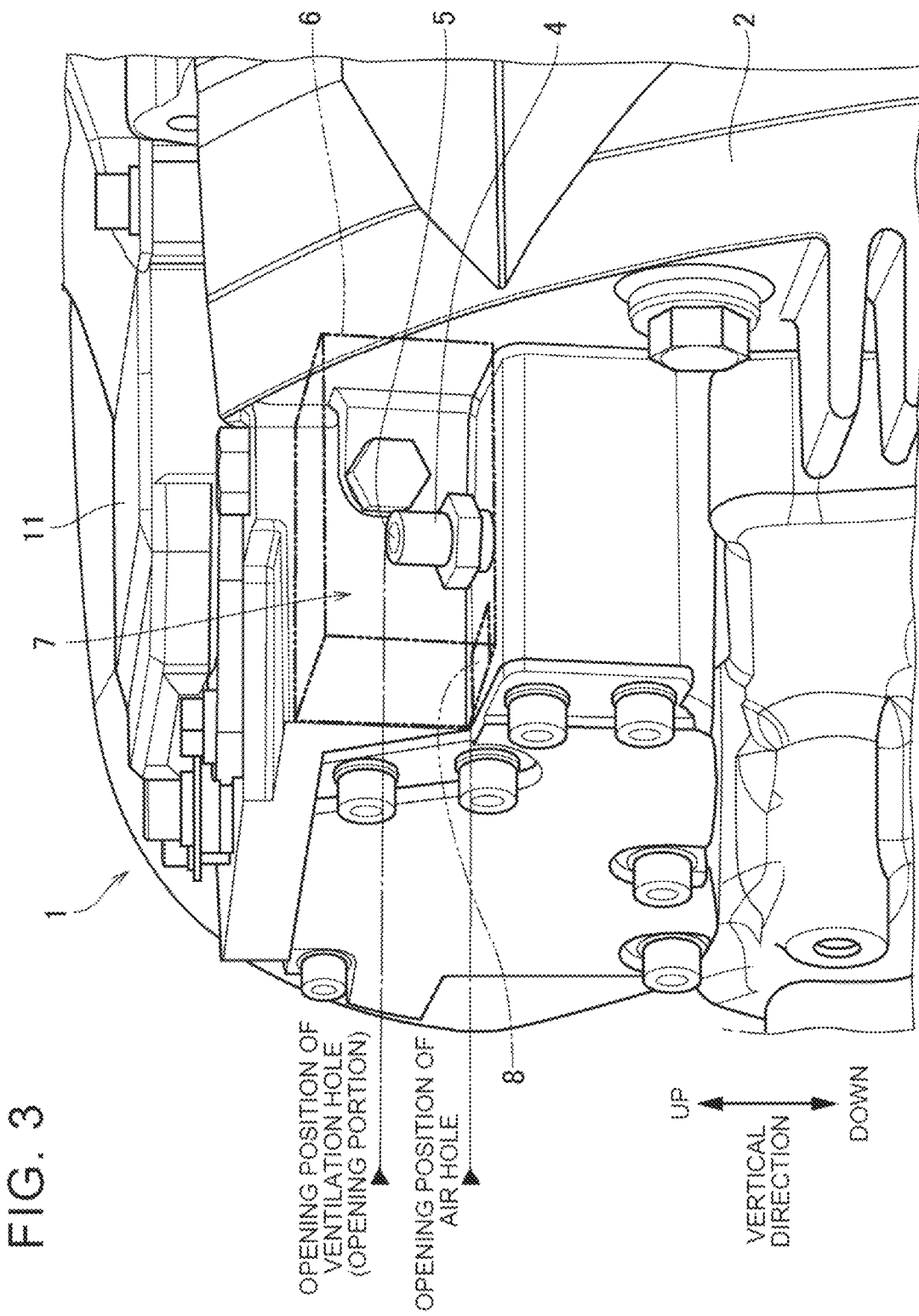
FIG. 3 is a diagram for explaining a configuration of the case structure of the in-wheel motor according to the disclosure, in which the diagram is a perspective view indicating a positional relationship between an opening position of the opening portion of the ventilation hole and an opening position of an air hole of the cover in a vertical direction.

An in-wheel motor that is a target in a case structure of an in-wheel motor in the embodiment of the present disclosure is mounted on, for example, an electrified vehicle such as a battery electric vehicle or a hybrid electric vehicle. The in-wheel motor incorporates a motor integrally with a wheel hub and an axle shaft to which a tire-wheel assembly is attached, and these are attached to a vehicle body together with a wheel via a suspension device (suspension mechanism). As an example of the in-wheel motor in the embodiment of the present disclosure, FIGS. 1, 2, and 3 show a motor unit (in-wheel motor) 1 in which the motor and a reduction mechanism are combined. The motor unit 1 shown in FIGS. 1, 2, and 3 is composed of a drive motor (not shown) housed in a case 2 and a deceleration mechanism (not shown) that amplifies a torque of the motor, respectively.

The motor constituting the motor unit 1 is composed of, for example, a permanent magnet type synchronous motor, an induction motor, or the like. The motor has at least a function as a prime mover that is driven by being supplied with electric power and that outputs torque. Further, the motor may function as a generator that generates electric power by being driven by receiving torque from the outside. That is, the motor may be a so-called motor generator having both a function as a prime mover and a function as a generator. A battery (not shown) is connected to the motor via an inverter (not shown). Thus, electric power stored in the battery is supplied to the motor, the motor functions as a prime mover, and drive torque is output. Further, the motor can be caused to function as a generator by torque transmitted from the tire-wheel assembly (not shown), and regenerative power generated at that time can be stored in the battery. Further, the motor can be regeneratively controlled during traveling, and the tire-wheel assembly can be braked by the regenerative torque generated at that time.

Further, the reduction mechanism is composed of, for example, a reduction gear pair (not shown) provided between two axes (not shown) parallel to each other. Specifically, the reduction mechanism includes a drive gear (not shown) attached to a rotating shaft (not shown) of the motor, and a driven gear (not shown) that is attached to an output shaft (not shown) of the motor unit 1 and that meshes with the drive gear. The driven gear has a larger diameter than the drive gear and has more teeth than the drive gear. Thus, a gear pair of the drive gear and the driven gear configures a reduction mechanism that decelerates the rotation speed of the rotation shaft (rotor shaft) of the motor, that is, amplifies an output torque of the motor. In the embodiment shown in FIGS. 1, 2, and 3, a wheel hub 3 is attached to an output shaft of the deceleration mechanism, that is, the output shaft of the motor unit 1. A wheel (not shown) of the tire-wheel assembly is attached to the wheel hub 3, Further, the in-wheel motor in the embodiment of the present disclosure is not limited to the motor unit 1 as described above, and may be, for example, a motor unit in which a planetary gear mechanism or a reduction mechanism having another configuration is combined with a motor. Further, an in-wheel motor having a configuration in which a wheel is directly attached to the motor without using a reduction mechanism may be used.

As described above, the case 2 houses the deceleration mechanism and the components of the motor such as a coil, a stator, and a rotor (none of which are shown). In other words, the case 2 defines an outer shell of the motor unit 1, that is, the in-wheel motor according to the embodiment of the present disclosure. Oil (not shown) for lubricating and cooling the motor and the speed reduction mechanism of the motor unit 1 is injected into the inner portion of the case 2.

Thus, the case 2 is sealed by using a sealing material, packing, or the like (none of which is shown) in order prevent oil from leaking from the case 2. However, when the motor unit 1 operates and the temperature inside the case 2 rises, the pressure inside the sealed case 2 also rises. Thus, the case 2 is provided with a ventilation hole 4 for suppressing an excessive increase in pressure in the case 2.

Figure 4:
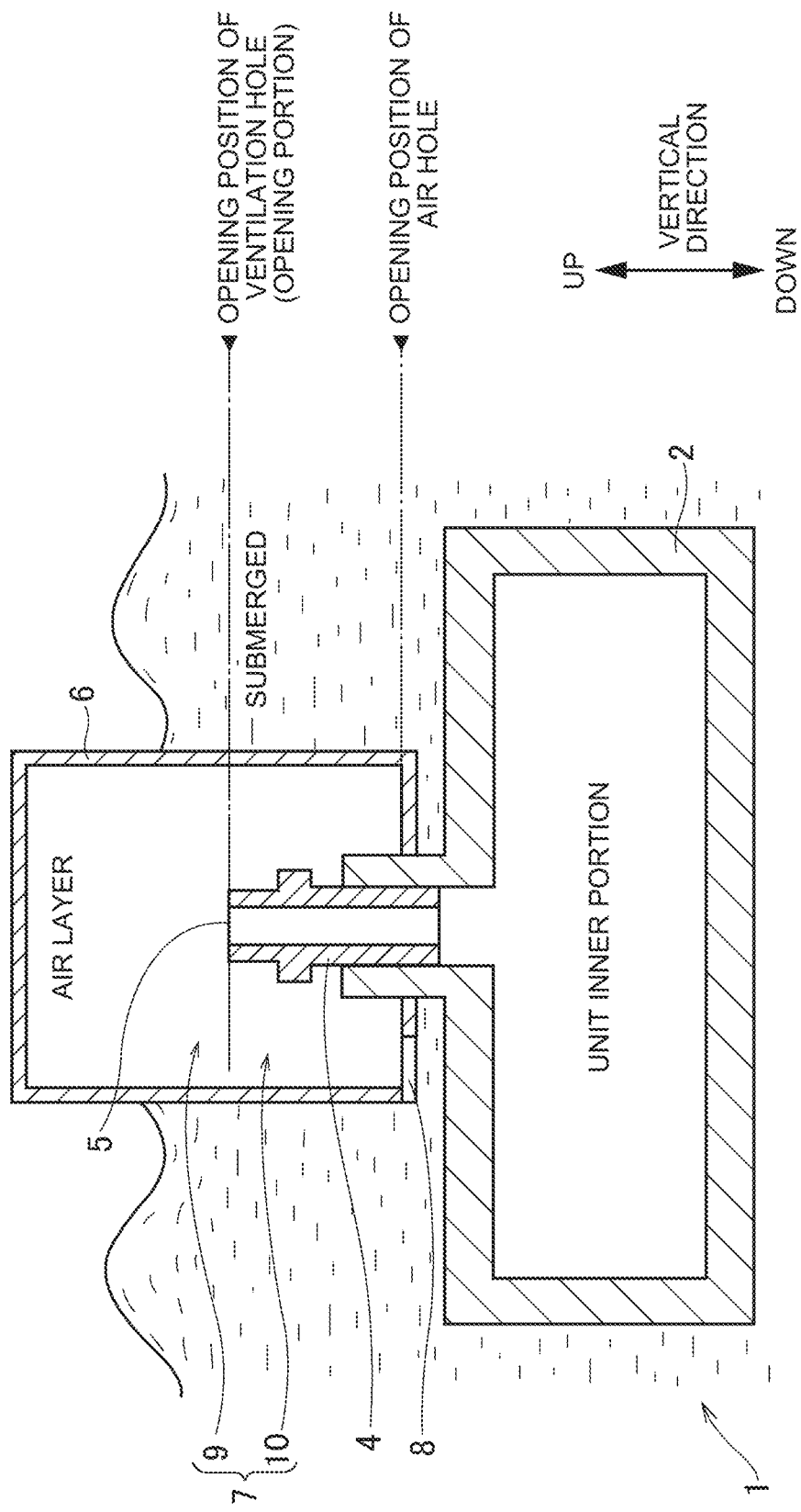
FIG. 4 is a diagram for explaining a configuration of the case structure of the in-wheel motor according to the disclosure, in which the diagram is a sectional view indicating details of the ventilation hole and the cover in the case structure of the in-wheel motor of the disclosure, and in which the diagram is a sectional vies indicating a state where, the case of the in-wheel motor is submerged.

As shown in FIG. 4, the ventilation hole 4 is formed of a cylindrical member. The ventilation holes 4 are provided in an upper part of the case 2 in the up-down direction (vertical direction in FIG. 4) so as to pass through the inner side of the case 2 and the outer side of the case 2. Thus, the ventilation hole 4 has a portion that opens to the inner side of the case 2 (lower side of FIG. 4) and a portion that opens to the outer side of the case 2 (upper side of FIG. 4). Among them, the portion that opens to the outer side of the case 2 is an opening portion 5 in the embodiment of the present disclosure. Thus, the ventilation hole 4 allows air to flow between the inner side of the case 2 and the outer side of the case 2, For example, when the motor unit 1 operates and the temperature inside the case 2 rises, a volume of air inside the case 2 expands accordingly. The air that expands at that time is released to the outer side of the case 2 through the opening portion 5 of the ventilation hole 4. Thus, the increase in pressure in the case 2 is suppressed.

Further, in the case structure of the in-wheel motor according to the embodiment of the present disclosure, as shown in FIGS. 2, 3, and 4, in order to suppress water or foreign matter from intruding into the case 2 through the opening portion 5 of the ventilation hole 4, a cover 6 that covers the ventilation holes 4 is provided from the outer side of the case 2. The cover 6 is attached to the case 2 so as to cover the ventilation hole 4 from the outer side of the case 2. For example, the cover 6 is made of resin or metal having a predetermined rigidity and strength, is molded separately from the case 2, and is attached to an outer surface of the case 2. Alternatively, the cover 6 is integrally formed with the case 2 so as to cover the ventilation hole 4 from the outer side of the case 2. For example, the cover 6 is integrally formed with the case 2 so that an air chamber 7 on the inner side of the cover 6 described later is provided.

In addition, in FIGS. 2 and 3 described above, and FIG. 6 described later, for convenience, the outline of the shape of the cover 6 is shown by a long dashed double short dashed line so that the ventilation hole 4 covered with the cover 6 can be seen through. Further, FIG. 1 shows a state in which the cover 6 is omitted or a state before the cover 6 is attached for convenience. Further, in FIGS. 2 and 3 described above and FIG. 6 described later, the cover 6 has a rectangular parallelepiped shape. However, the shape of the cover 6 in the embodiment of the disclosure is not limited to such a rectangular parallelepiped shape, and may be a cylindrical shape or a hemispherical shape, for example.

The cover 6 in the embodiment of the present disclosure has the air chamber 7 and the air hole 8.

The air chamber 7 is a space thrilled inside the cover 6, and holds the air on the inner side of the cover 6 in a state in which the cover 6 is attached to the case 2 or in a state in which the cover 6 is integrally formed with the case 2. An air hole 8 to be described later is formed below the air chamber 7 in the vertical direction (up-down direction in FIG. 4). Thus, the air chamber 7 is configured to hold air on the inner side of the cover 6 and above an opening position of the air hole 8 in the vertical direction.

Further, the air chamber 7 is divided into a first region 9 and a second region 10. The first region 9 is a region of the air chamber 7 positioned above the opening position of the opening portion 5 of the ventilation hole 4 in the vertical direction in a state where the cover 6 covers the ventilation hole 4. The second region 10 is a region of the air chamber 7 positioned below the opening position of the opening portion 5 of the ventilation hole 4 in the vertical direction in a state where the cover 6 covers the ventilation hole 4.

The air hole 8 is formed so as to open to the outer side of the cover 6 at a position below the opening position of the opening portion of the ventilation hole 4 in the vertical direction. Thus, the air inside the cover 6, that is, the air in the air chamber 7, can flow between the inner side and the outer side of the cover 6 through the air hole 8.

As described above, the air chamber 7 of the cover 6 is formed with the second region 10 positioned below the opening position of the opening portion 5 of the ventilation hole 4 in the vertical direction. As shown in FIG. 4, the second region 10 includes a volume V that holds air that suppresses a water level in the vertical direction in the cover 6 to be lower than the opening position of the opening portion 5 of the ventilation hole 4 when the motor unit 1 is submerged and water enters into the cover 6 from the air hole 8 of the cover 6. In other words, the cover 6 is formed so that the volume V as described above is secured as a volume of the second region 10 in the air chamber 7 of the cover 6.

Specifically, when the temperature inside the case 2 of the motor unit 1 decreases and the volume of the air inside the case 2 contracts (that is, when the air inside the case 2 contracts and the inside of the case 2 becomes a so-called negative pressure), the volume V of the second region 10 is larger than the volume corresponding to the maximum amount of air expected to be sucked into the case 2 through the opening portion of the ventilation hole 4.

For example, when the motor unit 1 is submerged while the motor unit 1 is in operation, it is assumed that the temperature of the air inside the case 2 drops from about 70° C. to about 20° C., that is, there is a temperature difference of about 50° C. in the air inside the case 2. As described above, the case 2 is provided with the ventilation hole 4, and the pressure inside the case 2 is maintained substantially constant. Thus, when there is a temperature difference of about 50° C. in the air in the case 2 as described above, it is estimated that the volume of the air in the case 2 changes about 18.3%, when the thermal expansion coefficient of the air is calculated as "0.00366/K". When the temperature of the air in the case 2 drops from around 70° C. to around 20° C., it can be estimated that the volume of the air in the case 2 decreases by about 18.3%. Thus, in the case structure of the in-wheel motor according to the embodiment of the present disclosure, the air chamber 7, that is, the cover 6 is formed so that the volume V of the second region 10 in the air chamber 7 of the cover 6 is, for example, larger than 20% (≈18.3%) of the volume of air existing in the case 2 at room temperature of around 20° C. Thus, for example, when the operating motor unit 1 is submerged, in a case in which the temperature inside the case 2 drops from a high temperature of about 100° C. to about 20° C. and in conjunction thereof the volume of air in the case 2 decreases by about 18.3% and inside the case 2 becomes negative pressure, it is possible to suppress water from entering the first region 9 of the cover 6, that is, suppress water from entering to the position of the opening portion 5 of the ventilation hole 4 in the cover 6. Therefore, with the case structure of the in-wheel motor according to the embodiment of the present disclosure, even if the motor unit 1 is submerged and water enters inside the cover 6, it is possible to surely suppress the water from entering inside from the ventilation holes 4 in the cover 6 to the inner side of the case 2.

FIG. 6 shows another configuration example of the case structure of the in-wheel motor according to the embodiment of the present disclosure, in the motor unit 1 illustrated and described with reference to FIG. 6 below, the members or parts having the same configuration and function as the motor unit 1 shown in FIGS. 1, 2, 3, 4, and 5 described above are assigned the same reference code as those used in FIGS. 1, 2, 3, 4, and 5.

The motor unit 1 shown in FIG. 6 includes a hood member 11 and a connecting member 12 in addition to the configurations shown in FIGS. 1, 2, 3, 4, and 5.

The hood member 11 covers the surface of the case 2 from the outer side of the case 2 and holds a predetermined volume of air. For example, the hood member 11 covers the surface of the case 2, an electric cable (not shown), and the like from the outer side of the case 2 in order to protect the electric cable laid on the outer surface of the case 2. The hood member 11 is another cover member (different from the cover 6) that is made of resin or metal having a predetermined rigidity and strength, is molded separately from the case 2, and is attached to the outer surface of the case 2. A sealing material or packing (not shown)) is provided between the outer surface of the case 2 and the hood member 11 in order to suppress water or foreign matter from entering to the inner side of the hood member 11. Thus, a predetermined volume of air is held in the space on the inner side of the hood member 11.

The connecting member 12 communicates air between the inside of the hood member 11 and the second region 10 in the air chamber 7 of the cover 6. For example, the connecting member 12 is formed of a rigid tubular member or a flexible tube-shaped or hose-shaped member. Both ends of the connecting member 12 are connected to the cover 6 and the hood member 11 so that air can flow. That is, the second region 10 of the cover 6 and the inside of the hood member 11 are communicated with by the connecting member 12 in a state where airtightness is maintained. Thus, the volume of the portion that holds air in the hood member 11 can be added to the volume of the second region 10 in the air chamber 7. Thereby, the degree of freedom when setting the volume: the second region 10 in the air chamber 7 can be increased.

As described above, in the case structure of the in-wheel motor according to the embodiment of the present disclosure, the cover 6 is provided to cover and protect the ventilation hole 4 for passing air between the inner side and the outer side of the case 2. The cover 6 is formed with the air hole 8 at a lower end portion in the vertical direction when the cover 6 is attached to the case 2. The cover 6 is open to the outside only at the portion of the air hole 8. Thus, the air chamber 7 for holding the air in the cover 6 is formed in the inner side portion above the air hole 8 in the vertical direction of the cover 6. The air chamber 7 can be divided into the first region 9 above the ventilation hole 4 and the second region 10 below the ventilation hole 4. The second region 10 thereof has a volume that holds the air that suppresses the water level of the water in the cover 6 in the vertical direction to be below the opening position of the opening portion 5 of the ventilation hole 4 when water enters from the air hole 8 of the cover 6. Thus, even if water enters inside the cover 6, it is possible to suppress water from entering from the ventilation holes 4 in the cover 6 to the inner side of the case 2.

Therefore, with the case structure of the in-wheel motor according to the embodiment of the present disclosure, even when the motor unit 1 (in-wheel motor) is submerged and the case 2 to which the ventilation hole 4 is attached is also submerged, it is possible to easily suppress water from entering the inner side of the case 2 with the cover 6 having a simple shape as described above.

What is claimed is:

1. A case structure of an in-wheel motor mounted on a vehicle, the case structure comprising a case that defines an outer shell of the in-wheel motor, a ventilation hole that is provided in the case and that allows air to flow between an inner side of the case and an outer side of the case, and a cover that covers the ventilation hole from the outer side of the case,
   wherein the ventilation hole includes an opening portion that opens to the outer side of the case in the cover,
   wherein the cover includes an air hole that is located below an opening position of the opening portion in a vertical direction and that opens to the outer side of the cover, and an air chamber that holds air above an opening position of the air hole in the vertical direction,
   wherein the air chamber is divided into a first region located above the opening position of the opening portion in the vertical direction, and a second region located below the opening position of the opening portion in the vertical direction,
   wherein the second region has a volume that holds air that suppresses a water level of water in the cover in the vertical direction to be below the opening position of the opening portion when the in-wheel motor is submerged and the water enters inside the cover from the air hole,
   wherein the air hole is entirely below the second region in the vertical direction;
   a hood member that covers a surface of the case from the outer side of the case and that holds a predetermined volume of air, wherein the hood member is a different element from the case; and
   a connecting member having a through hole that allows air to communicate between an inner portion of the hood member and the second region.

2. The case structure according to claim 1, wherein the volume of the second region is larger than a volume corresponding to a maximum air amount that is assumed to be sucked into the case from the opening portion when a temperature inside the case decreases and air inside the case contracts.

3. The case structure according to claim 2, wherein the volume of the second region is larger than 20% of a volume of air present in the case at room temperature.

* * * * *